United States Patent [19]

Zoller

[11] Patent Number: 5,183,303

[45] Date of Patent: Feb. 2, 1993

[54] DECORATIVE TRIM ATTACHING METHOD

[75] Inventor: Robert A. Zoller, Bay Village, Ohio

[73] Assignee: The Standard Products Company, Cleveland, Ohio

[21] Appl. No.: 766,447

[22] Filed: Sep. 26, 1991

[51] Int. Cl.⁵ .............................................. B60R 19/08
[52] U.S. Cl. ...................................... 293/120; 29/433; 29/525.1
[58] Field of Search .................. 293/120, 102; 29/423, 29/525.1

[56] References Cited

U.S. PATENT DOCUMENTS

| | | | |
|---|---|---|---|
| 3,778,093 | 12/1973 | Renner | 293/120 |
| 3,842,565 | 10/1974 | Brown et al. | 293/120 X |
| 3,848,916 | 11/1974 | Hulten | 293/120 |
| 4,142,573 | 3/1979 | Klie et al. | 293/102 |
| 4,325,574 | 4/1982 | Umemoto et al. | 293/120 |
| 4,364,591 | 12/1982 | Bien | 293/120 |

*Primary Examiner*—Robert R. Song
*Attorney, Agent, or Firm*—Harness, Dickey and Pierce

[57] ABSTRACT

A bumper fascia molding and method of making the same is accomplished by providing a trim strip with an overall T shape in cross section. The trim strip has a body portion and a stem. The trim strip is positioned onto a channel within the bumper fascia molding. A force is exerted on the decorative face to seat the trim strip in position in the bumper fascia molding. While the force is exerted, a securement mechanism is passed through the bumper fascia molding channel and trim strip to secure the trim strip within the bumper fascia channel. Read through is substantially eliminated on the outer decorative surface at the securement points.

11 Claims, 2 Drawing Sheets

DECORATIVE TRIM ATTACHING METHOD

BACKGROUND OF THE INVENTION

The present invention relates to automotive bumpers and, more particularly, to bumper fascia molding with a decorative trim strip.

In the past, decorative trim strips have decorated bumper fascia molding. The trim strips are retained on the molding by various methods. One way to secure the trim strip to the molding which is bonded to the bumper fascia molding. Additionally, the trim strips may be friction or interference fit into grooves or slots in the bumper fascia moldings to retain the trim strips.

While these methods of attaching the trim strip to the bumper fascia molding have been satisfactory, they have several disadvantages. While the adhesive tape normally retains the trim strip to the bumper fascia molding, the adhesive may weaken and the trim strip may voluntarily loosen or fall off the bumper fascia molding. Likewise, the adhesive tape is expensive and is labor intensive to apply to the bumper fascia molding. The positioning of a trim strip onto the bumper fascia molding with an interference fit connection has a tendency to stretch the trim strip during assembly. The stretching leads to an unacceptable aesthetic appearance. Also, when a bright surface decorative trim strip is used, "read through" may occur at the attachment points. This read through also leads to an unacceptable aesthetic appearance.

Accordingly, it is desirable to have a trim strip which provides a pleasing aesthetic appearance in a bumper fascia molding which overcomes the disadvantages of the relevant art. The present invention provides the art with a trim strip which is readily securable to a bumper fascia molding. The trim strip provides a drop in type of molding which substantially eliminates read through problems at the localized attachment points. Also, the present invention provides an easy assembly method which requires a minimal amount of assembly time. The present invention provides for better trim strip molding length control since there is no variable stretching during assembly. Further, molding for the life of the vehicle.

From the following detailed description taken in conjunction with the accompanying drawings and subjoined claims, other objects and advantages of the present invention will become apparent to those skilled in the art.

DETAILED DESCRIPTION OF THE PREFERRED EMBODIMENT

Figure 1:
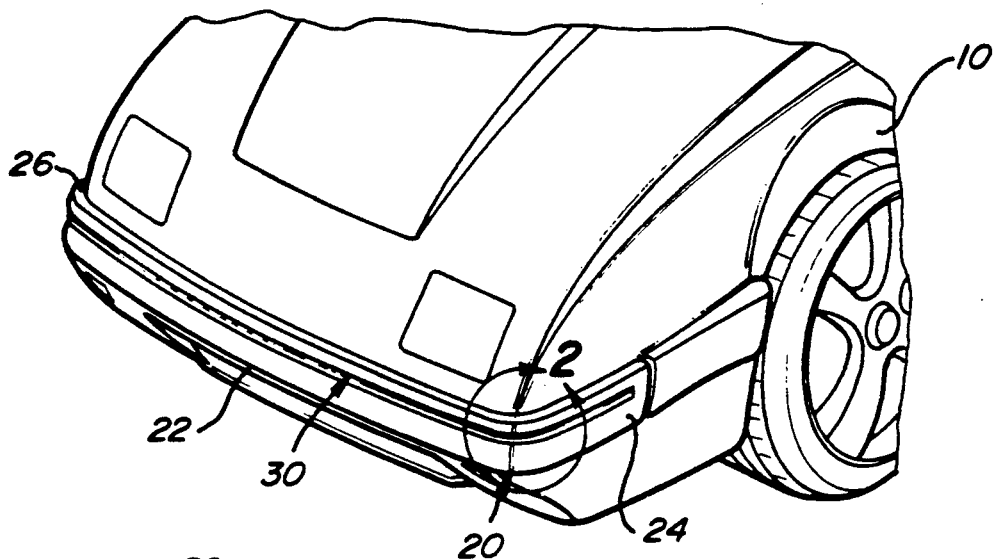
FIG. 1 is a perspective view of an automotive vehicle with a bumper fascia molding in accordance with the present invention.
Figure 2:
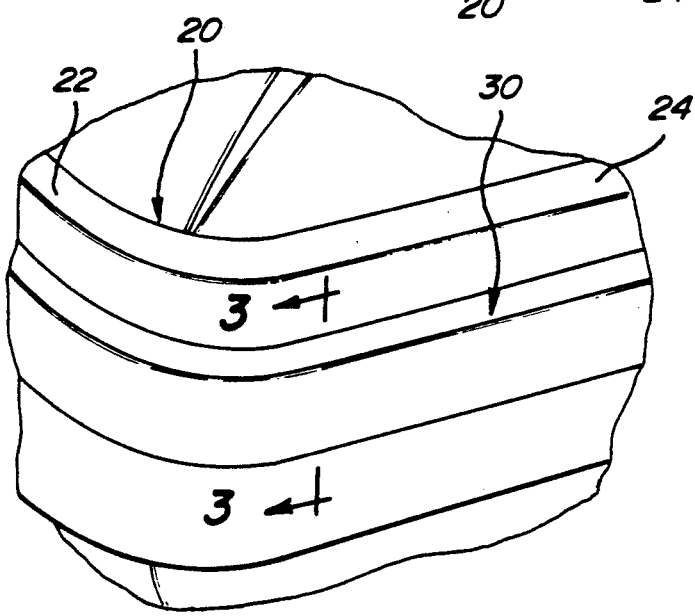
FIG. 2 is an enlarged perspective view of that of FIG. 1 within the circle 2.

Referring to FIG. 1, an automotive vehicle 10 is illustrated with a bumper fascia molding 20. The bumper fascia molding 20 includes a substantially planar front portion 22 with a pair of wraparound sides 24 and 26 on its ends. A trim strip 30 continuously extends longitudinally along the front portion 22 and side portions 24 and 26 of the bumper fascia molding 20. As seen in FIG. 2, the trim strip 30 conforms to the configuration of the front portion 22 and side portions 24 and 26 as it curves from the front to side portions.

Figure 3:
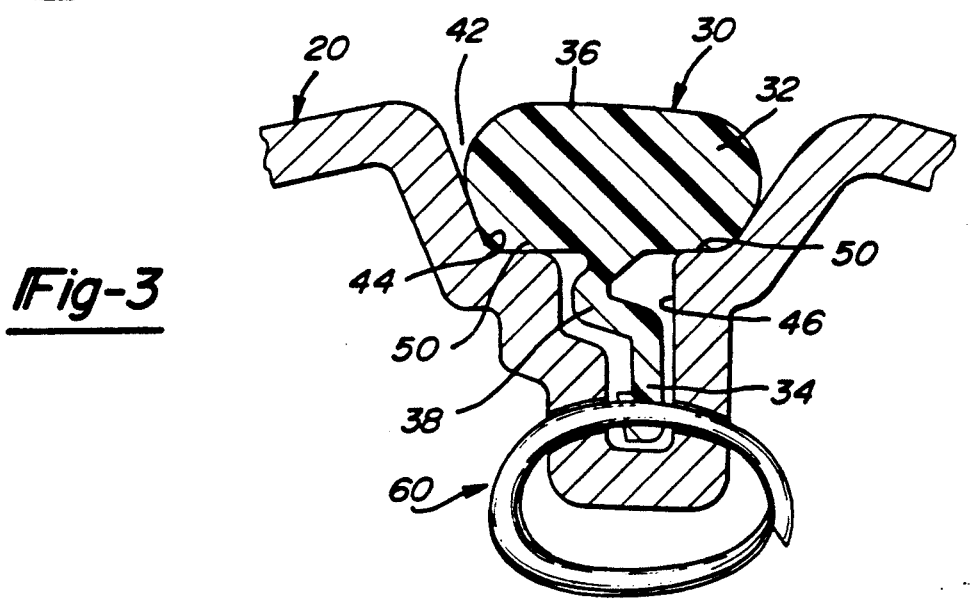
FIG. 3 is a sectional view of FIG. 2 along line 3—3 thereof.

Turning to FIG. 3, the trim strip 30 is illustrated including a body portion 32 and a stem 34. The trim strip 30 has an overall T shape in transverse cross section as can be seen in FIG. 3. The body portion 32 has an outer decorative surface 36 which provides a pleasing aesthetic appearance. The stem 34 is longitudinally continuous along the body portion 32. The stem 34 may include a dampening portion 38 to enhance the elimination of read through. The dampening portion 38 generally includes a flattened elongated S shape in cross section as illustrated in FIG. 3. It is believed that the stem substantially reduces the read through at the attachment points.

The bumper fascia molding 20 includes a receiving channel 42. The receiving channel 42 may have a trough portion 44 and an extending portion 46. The receiving channel 42 thus defines an overall T shape indentation when viewed in transverse cross section as seen in FIG. 3. As can be seen, the trough has a bottoming surface 50 which receives the body of the trim strip. Also, the receiving channel may be modified to have a bottoming surface flush with the fascia molding and an extending channel or a shallow trough and an extending portion. Thus, the molding body may extend from the fascia, be slightly above to flush with the fascia or below the fascia surface as seen in FIG. 3.

Also, a securing mechanism 60 retains the trim strip 30 within the bumper fascia molding channel 42. This securement mechanism 60 may be a hog ring, staple or the like. Generally, the ring 60 is passed through the plastic channel extending portion 46 through the plastic trim strip stem 34 and the other end is moved around to form a circle like that seen in FIG. 3.

Figure 4:
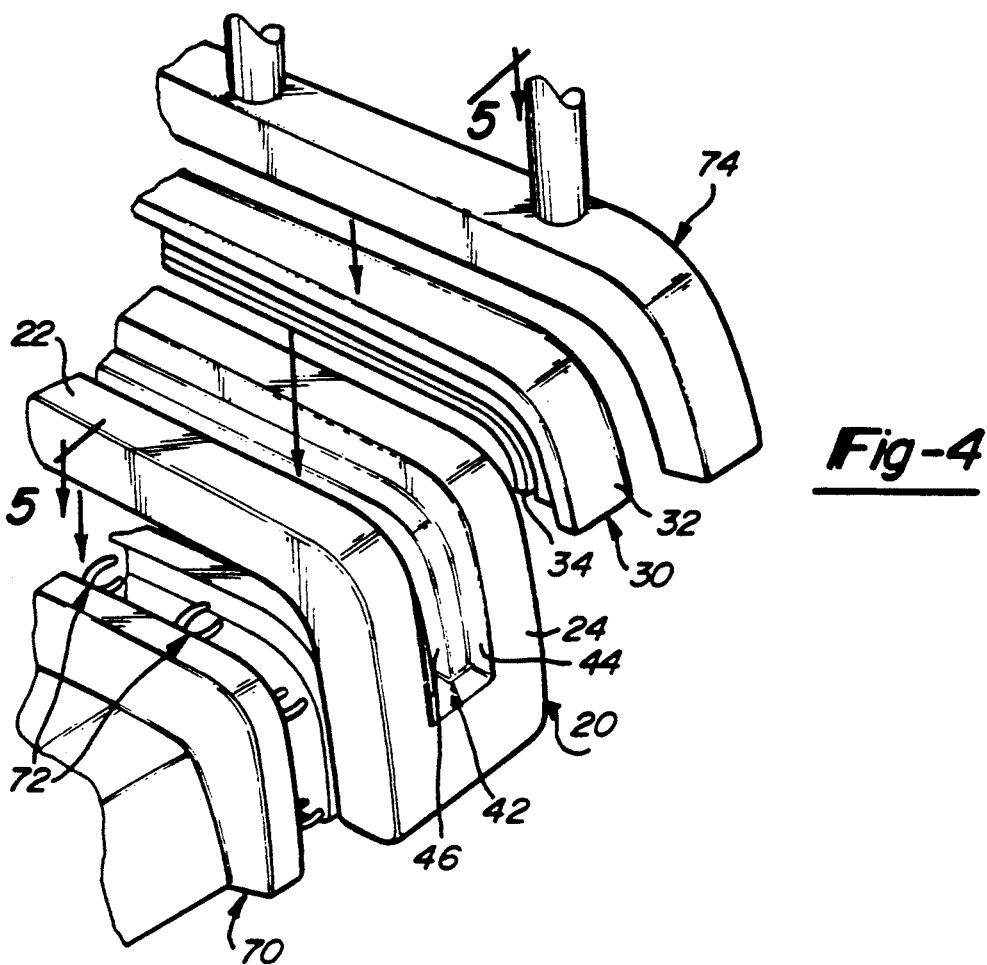
FIG. 4 is an exploded perspective view of an assembly attaching the trim strip to the bumper fascia molding.

Turning to FIG. 4, an apparatus for manufacturing the bumper fascia molding is shown. Generally, the bumper fascia molding 20 is manufactured as follows.

Figure 5:
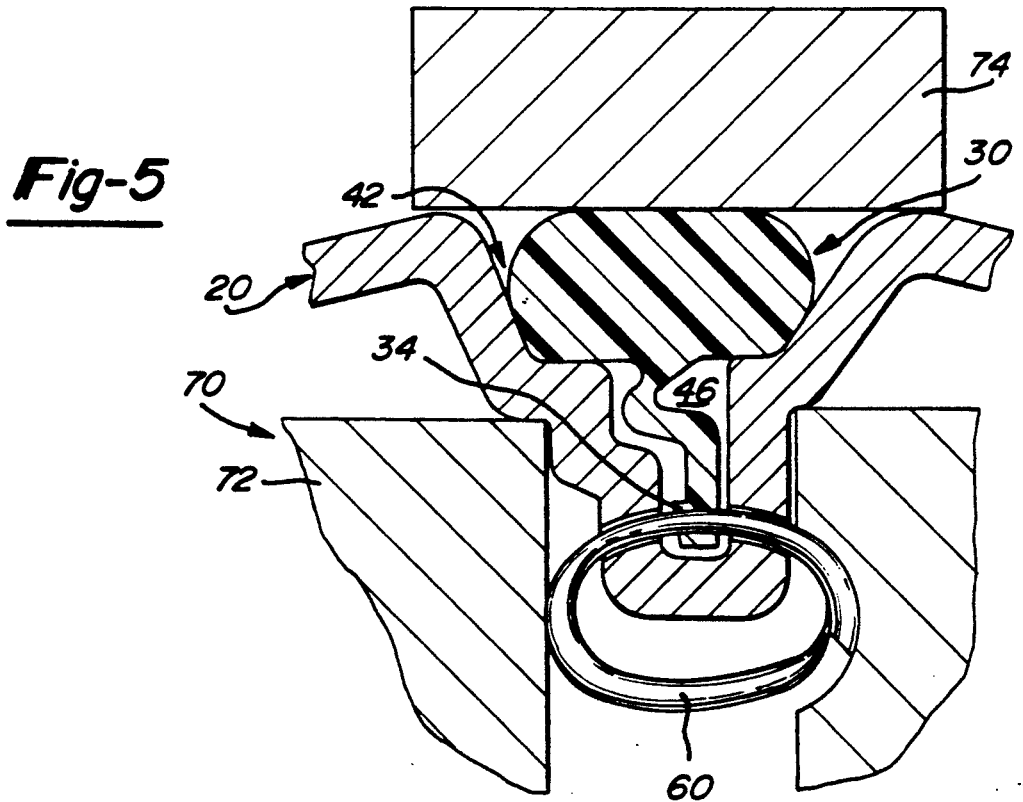
FIG. 5 is a sectional view of the assembly of FIG. 4 in a down position along the line 5—5 thereof.

The fascia 20 is positioned onto a stapling mechanism 70. The stapling mechanism 70 includes a plurality of staplers 72 which pass the hog rings or staples 60 through the fascia 20 and trim strip 30. The trim strip 30 is positioned into the bumper fascia 20 in the receiving channel 42. A pressure pad 74, having a shape corresponding to that of the bumper fascia 20 is moved towards the bumper fascia 20 to hold the trim strip 30 into the channel, as seen in FIG. 5. When the pad 74 has contacted the trim strip 30 such that the trim strip 30 has bottomed out in the channel shallow trough portion 44 of the bumper fascia 20 as seen in FIG. 5, the securement mechanism 60 is passed through the fascia channel extending portion 46 and trim strip stem 34 to secure the trim strip 30 therein. Several staplers 72 simultaneously staple the trim strip 30 into the fascia 20. The pad 74 is moved upward and the bumper fascia is removed from the stapling mechanism 70. Thus, a bumper fascia molding 20 is provided with a trim strip 30 which provides a pleasing aesthetic appearance. Also, the read through at the securement point is substantially eliminated.

While the above detailed description describes the preferred embodiment of the present invention, the invention is susceptible to modification, variation, and alteration without deviating from the scope and fair meaning of the subjoined claims.

What is claimed is:

1. A method of attaching a trim strip to a bumper fascia molding with a receiving channel comprising:
   providing a trim strip having an overall T shape in cross section with an outer decorative face and a dampening shape stem;
   positioning said trim strip in the bumper fascia channel with the dampening stem in said channel;
   exerting a force on said outer decorative surface to seat said trim strip in position on said bumper fascia;
   passing a stapling means through the receiving channel and the dampening stem; and
   securing said stem in the bumper fascia channel with said stapling means such that said stapling means maintains said stem in the channel to provide an aesthetic appearance on said outer decorative surface at securement positions.

2. The method according to claim 1 wherein said securing further comprises passing a plurality of hog rings through said bumper channel and stem to secure said trim strip in said channel.

3. The method according to claim 1 wherein said exerting step includes pushing downward said trim strip so that it bottoms in said bumper channel.

4. A method of attaching a trim strip to a bumper fascia molding with a receiving channel comprising:
   providing a trim strip having an overall T shape in cross section with an outer decorative face and a stem;
   positioning said trim strip in the bumper channel with the stem in said channel;
   exerting a force on said outer decorative face to seat said trim strip in position on said bumper fascia;
   passing a stapling means through the receiving channel and the dampening stem; and
   securing said stem in the bumper fascia channel with said stapling means such that the stapling means maintains said stem in the channel to provide an aesthetic appearance on said outer decorative surface at securement positions.

5. The method according to claim 4 wherein said securing further comprises passing a plurality of hog rings through said bumper channel and stem to secure said trim strip in said channel.

6. The method according to claim 4 wherein said exerting step includes pushing downward said trim strip until it bottoms in said bumper fascia channel.

7. A bumper fascia comprising:
   a bumper fascia molding having an elongated receiving channel integrally molded therein;
   a trim strip having an outer decorative facing and an integral stem, said stem includes a damping portion, and said trim strip having an overall T shape in cross section;
   said trim strip positioned in said receiving channel with said outer decorative face providing an aesthetic appearance; and
   securing means for retaining said trim strip in said bumper fascia molding, said securing means being passed through the receiving channel and stem and spaced positioned on said bumper fascia molding and said stem in said channel to provide an aesthetic appearance on the outer decorative surface at attachment points.

8. The bumper fascia according to claim 7 wherein said stem includes a dampening portion.

9. The bumper fascia according to claim 7 wherein said receiving channel has an overall T shape in cross section to receive said trim strip.

10. The bumper fascia according to claim 7 wherein said securement means is comprised of a plurality of hog rings.

11. The bumper fascia according to claim 7 wherein said securement means is comprised of a plurality of staples.

* * * * *

UNITED STATES PATENT AND TRADEMARK OFFICE
CERTIFICATE OF CORRECTION

PATENT NO. : 5,183,303

DATED : February 2, 1993

INVENTOR(S) : Robert A. Zoller

It is certified that error appears in the above-identified patent and that said Letters Patent is hereby corrected as shown below:

Title Page, References Cited, "4,142,573" should be --4,142,753--

Column 1, line 11, insert --is to include an adhesive tape or the like on the trim strip-- after "molding"

Column 1, line 43, insert --the trim strip is more positively attached to the bumper fascia-- after "Further"

Column 4, line 2, Claim 4, "the" should be --said--

Signed and Sealed this

Twenty-third Day of November, 1993

*Attest:*

BRUCE LEHMAN

*Attesting Officer*     *Commissioner of Patents and Trademarks*